United States Patent

Nomura et al.

[11] Patent Number: 5,194,191
[45] Date of Patent: Mar. 16, 1993

[54] PREPARATION OF THREAD-WOUND GOLF BALLS

[75] Inventors: Jun Nomura; Jumei Harada, both of Yokohama, Japan

[73] Assignee: Bridgestone Corporation, Tokyo, Japan

[21] Appl. No.: 707,864

[22] Filed: May 31, 1991

[30] Foreign Application Priority Data

Jun. 1, 1990 [JP] Japan .................................. 2-144023

[51] Int. Cl.$^5$ ........................ B29C 63/04; B29C 71/04
[52] U.S. Cl. ...................................... 264/25; 264/28; 264/234; 273/216
[58] Field of Search .................... 264/25, 26, 28, 234, 264/239; 273/216, 227, 231, 235 A, 235 B

[56] References Cited

U.S. PATENT DOCUMENTS

| | | | |
|---|---|---|---|
| 3,130,974 | 4/1964 | Muccino | 273/216 |
| 4,554,347 | 11/1985 | Hawkes, Jr. | 264/25 |
| 4,653,758 | 3/1987 | Solheim | 264/239 |
| 4,783,078 | 11/1988 | Brown et al. | 273/216 |
| 4,805,914 | 2/1989 | Toland | 273/227 |
| 4,855,553 | 8/1989 | Minobe | 264/25 |
| 5,006,297 | 4/1991 | Brown et al. | 264/234 |

Primary Examiner—Jan H. Silbaugh
Assistant Examiner—Brian J. Eastley
Attorney, Agent, or Firm—Sughrue, Mion, Zinn, Macpeak & Seas

[57] ABSTRACT

Thread—wound golf balls are prepared by winding a rubber thread around a frozen core to form a core ball, immediately thereafter microwave heating the core ball to thaw the core, and forming a cover over the core ball. Microwave heating causes the frozen core to be briefly thawed without heating the thread rubber layer and without moisture condensation on the core ball surface, reducing the time taken for the core thawing step and eliminating the need for a drying step.

4 Claims, 2 Drawing Sheets

PREPARATION OF THREAD-WOUND GOLF BALLS

This invention relates to thread-wound golf balls, and more particularly, to a method for preparing thread-wound golf balls by winding thread rubber around a core to form a core ball and enclosing the core ball in a cover.

BACKGROUND OF THE INVENTION

Thread-wound golf balls are generally prepared by winding a length of high elongation thread rubber around a core to form a core ball and applying a cover thereto. The cores used include liquid centers wherein a hollow spherical centerback of rubber or the like is filled in its hollow interior with water or liquid containing a specific gravity modifier and solid centers obtained by consolidating rubber compound. Since liquid centers are too soft to wind thread rubber thereon, liquid center cores are frozen and solidified with dry ice, liquid nitrogen or another refrigerant before rubber thread is wound thereon. Depending on whether the rubber composition is soft or hard, some solid centers allow a rubber thread to be wound thereon without freezing, but solid centers of relatively soft type compositions are frozen with an appropriate refrigerant prior to thread rubber winding. After winding of rubber thread on frozen cores, the cores are allowed to thaw and then enclosed in covers.

During spontaneous thawing of the cores having thread rubber wound thereon, the thread rubber layer circumscribing the core is cooled. Then ambient moisture condenses on the surface of core balls within about 3 to 10 minutes after the completion of thread rubber winding, wetting the core ball surface with water. If core balls whose surface is wet were subsequently provided with covers, shaping deficiencies like bears and voids would frequently occur in the cover shaping step and a loss of adhesion between the cover and the thread rubber layer would allow the balls to deform upon hitting.

One prior art approach to avoid such inconvenience was by allowing the cores having thread rubber wound thereon to spontaneously thaw and then drying the core balls to remove water from their surface prior to enclosing the core balls in covers. However, the time taken for the core thawing and core ball drying steps was as long as 3 to 14 hours though it somewhat varies with the season. The time required for thawing and drying formed a neck against the development of a continuous automatic process for the manufacture of thread-wound golf balls.

The present invention has been made to overcome the problems of the prior art and its object is to provide a method for preparing a thread-wound golf ball which features a substantial reduction in the core thawing time and eliminates the need for core ball drying, thus greatly contributing to the development of a continuous automatic process.

SUMMARY OF THE INVENTION

The present invention is directed to a method for preparing a thread-wound golf ball by continuously winding a length of rubber thread around a frozen core to form a core ball, causing the core ball to thaw, and enclosing the core ball with a cover. Immediately after formation of the core ball, it is exposed to microwave radiation for heat thawing.

According to the present invention, the frozen core is defrosted by microwave heating within a substantially shorter time than would be required for spontaneous thawing. Since the thread rubber layer is unlikely to absorb microwave, only the core can be heated and thawed without substantial heating of the thread rubber layer, with the attendant benefit of keeping the thread rubber layer free from thermal degradation. Microwave thawing immediately following the completion of thread rubber winding leaves no room for the thread rubber layer to be refrigerated, thus eliminating the possibility of moisture condensation on the core ball surface.

BRIEF DESCRIPTION OF THE DRAWINGS

The above and other objects, feature, and advantages of the present invention will be better understood from the following description taken in conjunction with the accompanying drawings, in which.

DESCRIPTION OF THE PREFERRED EMBODIMENTS

In the practice of the present invention, a core ball is first prepared by freezing a core and continuously winding a length of thread rubber around the core by conventional winding techniques such as random winding and great circle winding techniques.

The core used may be either a liquid center or a solid center. Since cores of a material which is likely to absorb microwave to produce heat are more effective, the present invention favors liquid centers wherein a centerback is filled with water optionally containing a specific gravity modifier. The cores are frozen using dry ice, liquid nitrogen or other refrigerants, preferably at a freezing temperature of $-20°$ C. to $-90°$ C.

A next step is to expose to microwave radiation the core ball immediately after the completion of thread winding, thereby heating the core for thawing to render the core ball ready for covering. Microwave irradiation is preferably initiated within 120 seconds, more preferably within 60 seconds after the completion of thread winding because such immediate heat thawing prevents cooling of the thread rubber layer and moisture condensation on the core ball surface therewith.

The frequency of microwave is not critical in a technical sense. It may be selected depending on a particular type of material to be heated, generally in the ranges of 840 to 940 MHz and 2420 to 2480 MHz. The time for microwave heating of cores varies with the core freezing temperature, core material and other factors. Preferably the microwave heating time per core ranges from about 5 to about 20 seconds when conventional liquid centers frozen at $-70°$ C. to $-80°$ C. are heated with microwave at an output of 600 watts and an oscillation frequency of 2450 MHz. This allows only the core to be heated and thawed without heating the thread rubber layer. If the core were heated to a too high temperature, the surrounding thread rubber layer would also become hot so that the rubber might be heat deteriorated. Such inconvenience is avoided by limiting the microwave heating time.

Figure 1:
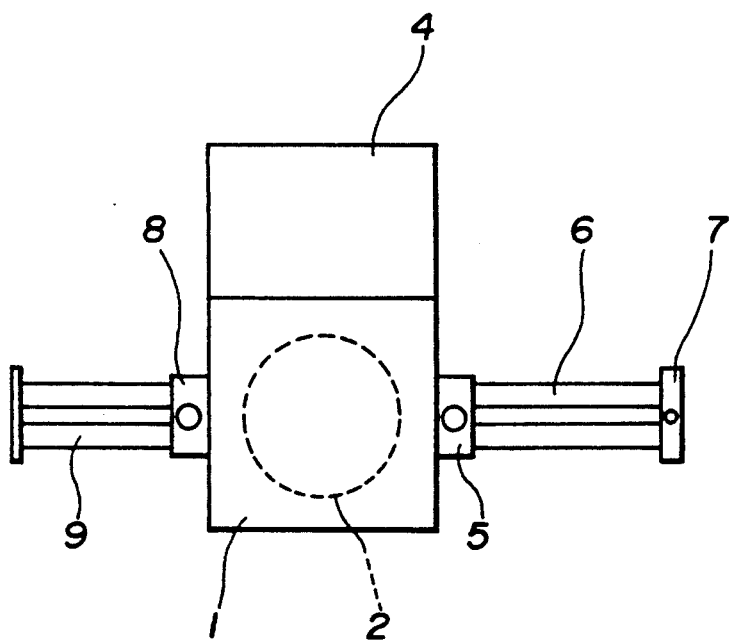
FIG. 1 is a plan view of an exemplary magnetron heating apparatus for use in heat thawing frozen cores.
Figure 2:
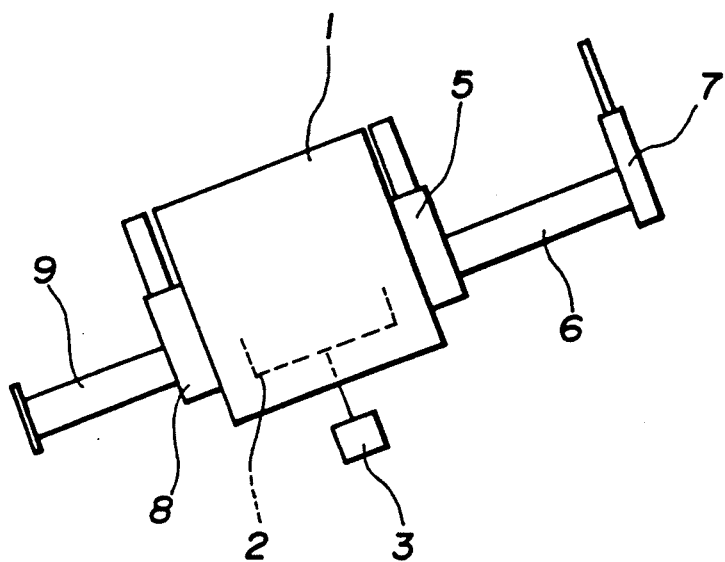
FIG. 2 is a side view of the apparatus of FIG. 1.

The arrangement of an apparatus used for microwave thawing of the frozen core is not critical although a magnetron heating apparatus as shown in FIGS. 1 and 2 is advantageous for use in the practice of the present invention. In FIGS. 1 and 2, an exemplary magnetron heating apparatus is illustrated as comprising a box-shaped heating chamber 1, a turntable 2 rotatably disposed in the chamber 1, a motor 3 for rotating the turntable 2, and a microwave generator unit 4 including a magnetron tube operating at a frequency of 2450 MHz, a magnetron power source, a timer circuit and other components (not shown). Also illustrated are an inlet gate 5 on one side of the chamber 1, a guide rail 6 extending therefrom, a hydraulic cylinder 7, an outlet gate 8 on the opposite side of the chamber 1, and a discharge rail 9 extending therefrom in alignment with the inlet rail 6. The apparatus as a whole is inclined downward from the guide rail 6 toward the discharge rail 9.

Figure 3:
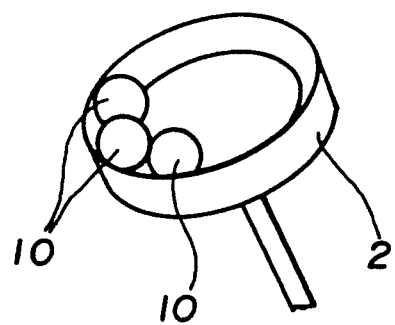
FIG. 3 schematically illustrates core balls being heated on the turntable of the apparatus of FIG. 1.

The cores of the core balls are defrosted in the illustrated magnetron heating apparatus by first actuating the cylinder 7 to deliver a predetermined number (typically 1 to 4) of core balls on the guide rail 6. When the apparatus is ready for heating, the inlet gate 5 is opened to allow the core balls to roll into the turntable 2. While the turntable 2 is rotated, microwave is irradiated to the core balls to heat their cores for thawing. Since the turntable 2 is installed at a certain angle of inclination, rotation of the turntable 2 causes the core balls 10 to tumble thereon while being biased in a downward direction as shown in FIG. 3, so that the core balls 10 receive uniform microwave exposure. After microwave heating for a predetermined time, the outlet gate 8 is opened to allow the core balls to roll out along the discharge rail 9.

After thawing of the core, the core ball is enclosed with a cover. The manufacturing process can immediately transfer from the core ball forming step to the cover forming step because no moisture condensation takes place on the core ball surface, eliminating the need for a drying step which was essential in the prior art.

The material and size of ball components in a preferred embodiment are now described although the invention is not limited thereto. The core may be either a liquid center or a solid center as previously mentioned. The liquid center may be a spherical natural rubber filled with liquid and the solid center may be a spherical solid butadiene rubber and/or natural rubber, although the liquid center material and solid center material are not limited thereto. The core generally has a weight of about 15 to 25 grams and a diameter of about 26 to 30 mm. The thread is of natural rubber, isoprene rubber or the like and has a width of about 1.0 to 2.8 mm and a thickness of about 0.3 to 1.0 mm (before winding). It is continuously wound on the core plural turns, typically 1,000 to 3,000 turns under a tension of about 200 to 600 grams/thread. The core ball is finally enclosed in a cover typically of balata and ionomer resins with a thickness of about 0.5 to 3 mm. The completed golf balls should meet the standards, typically have a weight of 45.3 grams and a diameter of 42.75 mm in the case of large balls and a weight of 45.3 grams and a diameter of 41.13 mm in the case of small balls.

EXAMPLE

Examples of the present invention are given below by way of illustration and not by way of limitation.

Examples 1-3

Liquid centers having a centerback filled with a mixture of water and a specific gravity modifier were frozen by refrigerating at −76° C. with dry ice. A length of thread rubber was wound on each liquid center. Immediately after the completion of thread winding, the cores were heated for thawing by applying microwave at an output of 600 watts and an oscillation frequency of 2450 MHz under the conditions reported in Table 1. The core and the thread rubber layer were measured for temperature. The results are also shown in Table 1. Subsequent to thawing, each core ball was enclosed with a cover.

TABLE 1

| Example | Microwave heating time | Number of cores heated | Temperature of core | Temperature of thread rubber layer |
|---------|------------------------|------------------------|---------------------|-------------------------------------|
| 1 | 10 sec. | 1 | 20° C. | 20° C. |
| 2 | 20 sec. | 1 | 50° C. | 40° C. |
| 3 | 30 sec. | 2 | 25° C. | 20° C. |

As seen from Table 1, a microwave heating time per core of as short as 10 to 20 seconds is sufficient to thaw only the core without substantially heating the thread rubber layer.

The golf balls of Examples 1 to 3 were free of shaping deficiencies like bears and voids which would otherwise occur in the cover shaping step and did not experience deformation upon hitting which would otherwise be incurred due to a loss of adhesion between the cover and the thread rubber layer.

There has been described a method for preparing a thread-wound golf ball by winding a rubber thread around a frozen core to form a core ball, immediately thereafter microwave heating the core ball to thaw the core, and forming a cover over the core ball. The frozen core can be briefly thawed by microwave heating without heating the thread rubber layer and without moisture condensation on the core ball surface. Therefore, the present invention is successful in greatly reducing the time taken for the core thawing step and eliminating the need for a drying step, thus contributing to a continuous automatic manufacture process.

Although some preferred embodiments have been described, many modifications and variations may be made thereto in the light of the above teachings. It is therefore to be understood that within the scope of the appended claims, the invention may be practiced otherwise than as specifically described.

We claim:

1. A method for preparing a thread-wound golf ball, comprising the steps of: continuously winding a length of rubber thread around a frozen core to form a core ball;

immediately after formation of the core ball, causing the core ball to thaw by exposing the core ball to microwave radiation for heat thawing, thus eliminating the possibility of moisture condensation on the core ball, the core being thawed without substantial heating of the rubber thread; and enclosing the core ball in a cover.

2. The method of claim 1 wherein the core is a liquid center.

3. The method of claim 1 wherein the microwave irradiation is initiated within 120 seconds after the completion of thread winding.

4. The method of claim 1 wherein the microwave irradiation is continued for a time of from about 5 to about 20 seconds per core when a liquid center frozen at −70° C. to 80° C. is heated with microwave at an output of about 600 watts and a frequency of 2420 to 2480 MHz.

* * * * *